Sept. 13, 1949.                J. R. ADAMS                 2,481,708
                REEL AND MECHANISM FOR INVERSE WINDING
                         OF MOTION-PICTURE FILMS
Filed Jan. 3, 1949                                      2 Sheets-Sheet 1

INVENTOR,
James R. Adams
BY
*Henry Molz*
ATTORNEY.

Sept. 13, 1949.  J. R. ADAMS  2,481,708
REEL AND MECHANISM FOR INVERSE WINDING
OF MOTION-PICTURE FILMS
Filed Jan. 3, 1949  2 Sheets-Sheet 2
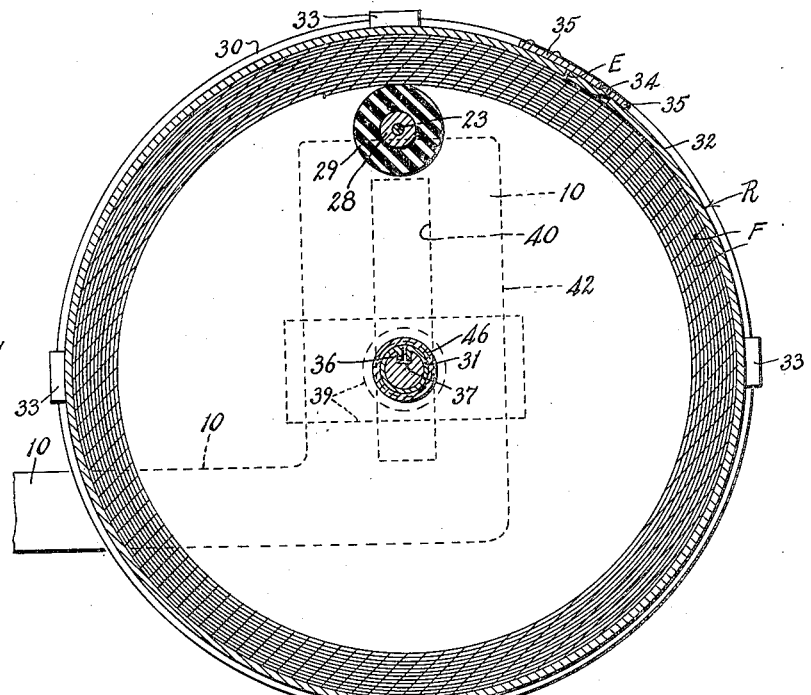
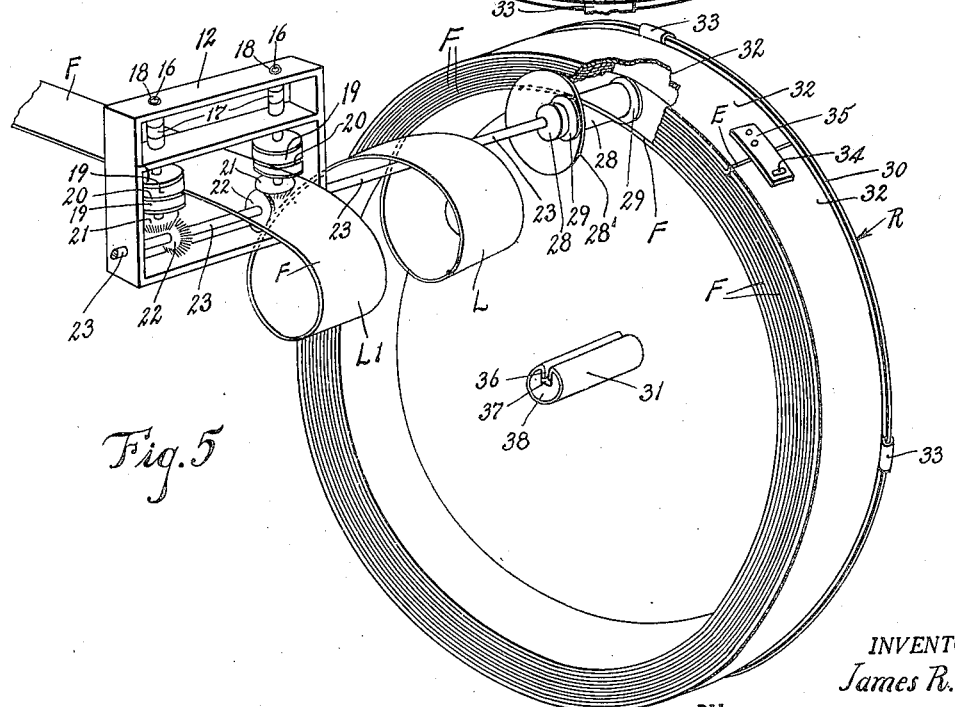
INVENTOR,
James R. Adams
BY
ATTORNEY.

Patented Sept. 13, 1949

2,481,708

UNITED STATES PATENT OFFICE 2,481,708

REEL AND MECHANISM FOR INVERSE WINDING OF MOTION-PICTURE FILM

James R. Adams, Los Angeles, Calif.

Application January 3, 1949, Serial No. 68,859

8 Claims. (Cl. 88—18.7)

1

The primary object of my invention is to provide a combination reel and film winding device whereby film released from a reel mounted on a projector, for example, is automatically rewound onto a second reel ready for attachment to the projector and re-running without the necessity of re-winding to bring the same heads-out as commonly termed in the motion picture camera art.

It is thus an important object of the invention to provide a device that will eliminate rewinding of the film to adapt it heads-out ready for re-projection.

A further object of the invention is to provide a sectional reel which is readily adapted for assembly as to form for all practical purposes of a solid reel.

A still further object of the invention is to provide a reel having an independent rim in connection with the reel loading process, and functioning to secure the film within the reel during the winding process, as well as for safely carrying the same about.

And a further object of the invention is to provide a novel means whereby sliding movement is automatically imparted to the film proper so that the latter will advance as it moves onwardly and forwardly toward the rewind reel for immediate showing in attachment to a film projector.

I attain these objects by the device illustrated in the accompanying drawings, in which:

Figure 4 is a section on line 4—4 of Fig. 3 and viewing the reel with a cover plate attached, and Figure 5 is a perspective view of the invention partly broken away and partly in phantom.

Figure 1:
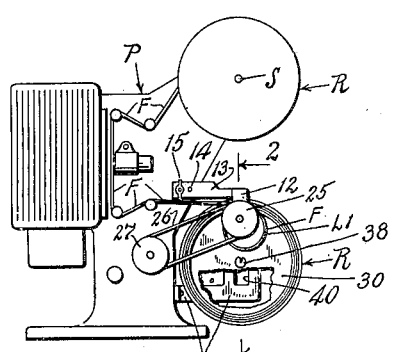
Figure 1 is a side elevation of a motion picture projector with a pair of reels mounted thereon.
Figures 2, 3:
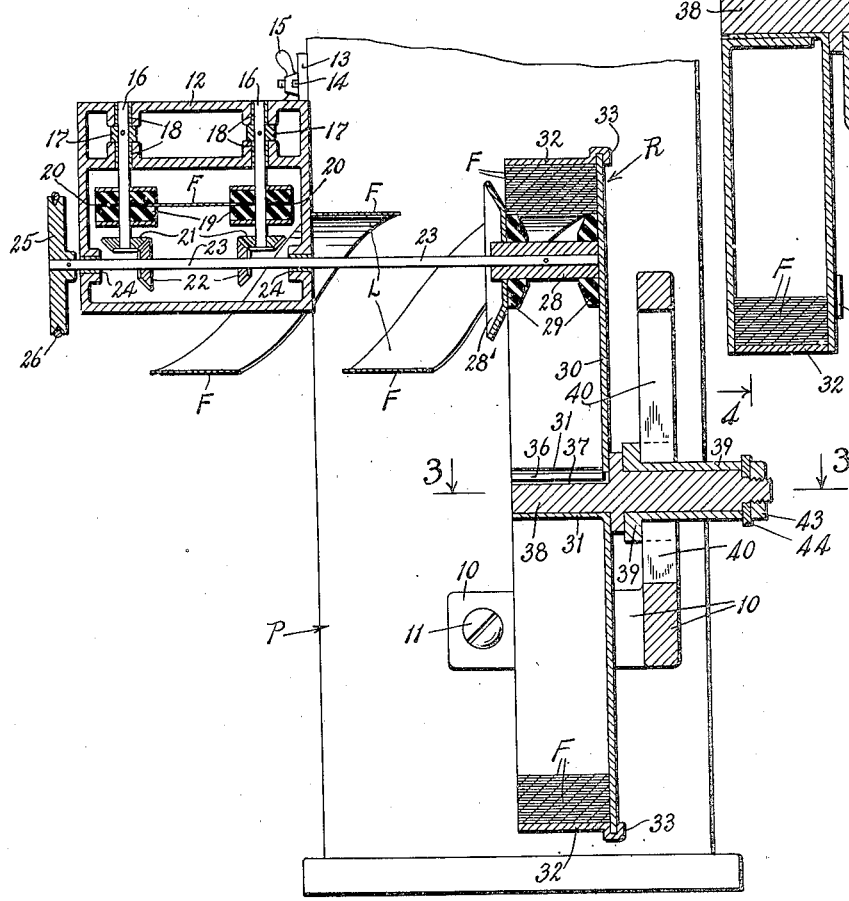
Figure 2 is a vertical section on line 2—2 of Fig. 1.
Figure 3 is a horizontal section on line 3—3 of Fig. 2.

Similar numerals and letters of reference indicate like parts throughout the several views. Thus, a motion picture projector P is shown in Fig. 1 having two self-inverting reels R—R detachably mounted thereon. The upper reel is mounted upon a conventional projector reel mounting spindle S, the lower reel R is movably supported on a bracket 10 especially provided and attached to the projector P as by screws 11.

A gear box 12 having a bracket 13 integrally formed thereon is attached to the projector P as by a pin 14 and a thumb screw 15. The gear box 12 is provided with a pair of shafts 16—16 having their axes vertically disposed and held against vertical movement by a pair of collars 17—17. Said shafts 16—16 are journaled in bearings 18—18 within the box 12.

Yieldable rubber pulleys 19—19 are fixed on and driven by the shafts 16—16. Said pulleys 19 may be separate wheels spaced slightly apart or may consist of but a single wheel having an annular groove instead of the space 20 shown.

The lower extremities of the shafts 16—16 each carry a bevel gear 21 which engages a mating gear 22 fixed to a horizontal drive shaft 23 journaled in bearings 24—24 carried by said gear box 12.

The shaft 23 is provided with a pulley 25 exteriorly of the box 12 which may be driven by a belt 26 engaging the driving means or pulley 27 of the projector P. The other end of said shaft 23, also exteriorly of the box 12, carries a driving roller 28 having a pair of rubber rims 29—29.

A cone shaped flange 28' is fixed to one end of the roller 28. Said roller 28 is spaced apart from the box 12 to provide space for a loop L of motion picture film F as shown best in Fig. 5. The flange 28' functions to align and retain the film F upon the rims 29. Said roller 28 with its rims 29—29 extends into the lower reel R.

The reels R—R embody a disc like plate 30 having an integral hollow hub 31 and a detachable rim 32. Hooks 33 are formed integral with the rim 32 and are provided to grasp the edge of the plate 30.

The rim 32 is a split band having one of its end provided with a struck-out tongue 34 which is engaged by a clasp 35 riveted to the other end of the rim 32.

The hub 31 is split at its periphery and bent inwardly toward its axis to form a key 36 for engagement with a key-way 37 provided in a spindle 38 journaled in a bearing 39 which is slidable vertically in a slot 40 in the bracket 10. Said bearing 39 is provided with a slide-way 41 of dovetail formation for slidable reception of the edges 42 of the bracket 10.

The spindle 38 is held against displacement from the bearing 39 by a nut 43 and a washer 44.

A cover plate 45 similar to the plate 30 is provided to prevent the film F from slipping edgewise when the reel R is transported, stored or used as the upper reel R in Fig. 1. Said plate 45 is further provided with a hollow hub 46 which telescopes the hub 31, the latter being contracted and reduced in diameter when the key 36 is forced into the key-way 37.

The cover plate 45 is placed upon the reel R before said reel is removed from the spindle 38.

When the reel R is removed from the spindle 38 the hub 31 will expand and tightly engage the hub 46 and thus form the complete reel R unit.

In operation, the inverse winding of the film F is accomplished by forcing the film to coil inside of itself from the perimeter toward the center of the reel R.

To provide for said accomplishment, the "beginning" end E of the film F (see Figs. 4 and 5) is first fed through the supporting means of the projector P in the conventional manner and then through the pulleys 19—19 after which a pair of loops L and L1 are made with the film F before said "beginning" end E is fed over the rims 29—29 of the roller 28. After being thus fed, the end E is clamped between the ends of the rim 32 and the clasp 35 is thereupon snapped over the tongue 34 to securely hold said end E.

The loops L and L1 are provided to cause the film F to move edgewise toward the roller 28, the better accomplished due to the natural resiliency of the film F when coiled into spring like shape.

The pulleys 19—19 pull the film from the projector P and push it into the loops L and L1 which continue to reform from the added film so as to be fed between the rims 29—29. The film is sufficiently stiff to be fed between the rims 29—29 and into the rim 32, and due to the driving action of the roller 28, the reel is driven clockwise and will continue so as long as additional film is fed into it and until a coil of film is wound within the reel with the "finish" end of the film on the inside of the coil adjacent the hub 31.

As the reel is freely vertically slidable on the bracket 10 and the film is fed into the reel between the rims 29—29 of the roller 28 and the rim 32 of the reel and maintained between these rims, it is apparent that as the windings in the reel increase in number they will force the reel to rise and thus provide adequate space between said rims to accommodate and hold closely coiled all of the windings of the film which are coiled into the reel.

When the film has been removed in accordance with the invention, and the reel has been mounted as required, the film may be re-projected upon removing the rim 32 and this, without first rewinding the same as is the more common practice in the art.

It should be apparent that changes in structure may from time to time suggest themselves, but within the scope of the herein invention. Hence, I do not limit the invention herein disclosed to the exact description and embodiment shown, but what I do claim is:

1. In a mechanism for rewinding a motion picture film in heads-out order as the film passes from a projector; a hollow cylindrical reel open on one side and having a rim against the inner side of which the film is wound, means for fixing the heads-out end of the film to said rim after said end of the film has been passed from the projector into the reel through the open side of the latter; means supporting said reel for rotation about a horizontal axis and affording vertical bodily movement of the reel while under rotation, a drive roller mounted to rotate about a fixed horizontal axis within said reel for contacting the film therein and holding the same against the rim whereby on rotation the roller will turn the reel in a direction for winding the film therein, means associated with said roller for guiding the film between the roller and the rim, means for feeding the film from the projector through said guiding means, and means for driving said feeding means and said roller, said reel being moved vertically and increasing the space between said rim and said drive roller as the number of convolutions increase during the winding of the film into said reel.

2. In a mechanism for rewinding a motion picture film in heads-out order as the film passes from a projector; a hollow cylindrical reel on one side and having a rim against the inner side of which the film is wound, means for fixing the heads-out end of the film to said rim after said end of the film has been passed from the projector into the reel through the open side of the latter; means supporting said reel for rotation about a horizontal axis and affording vertical bodily movement of the reel while under rotation, a drive roller mounted to rotate about a fixed horizontal axis within said reel for contacting the film therein and holding the same against the rim whereby on rotation the roller will turn the reel in a direction for winding the film therein, means associated with said roller for guiding the film between the roller and the rim, means for feeding the film from the projector through said guiding means, and means for driving said feeding means and said roller, said reel being moved vertically and increasing the space between said rim and said drive roller as the number of convolutions increase during the winding of the film into said reel; said film being loosely coiled into loops between said feeding means and said guiding means.

3. In a mechanism for rewinding a motion picture film in heads-out order as the film passes from a projector; a hollow cylindrical reel open on one side and having a rim against the inner side of which the film is wound, means for fixing the heads-out end of the film to said rim after said end of the film has been passed from the projector into the reel through the open side of the latter; means supporting said reel for rotation about a horizontal axis and affording vertical bodily movement of the reel while under rotation, a drive roller mounted to rotate about a fixed horizontal axis within said reel for contacting the film therein and holding the same against the rim whereby on rotation the roller will turn the reel in a direction for winding the film therein, means associated with said roller for guiding the film between the roller and the rim; feed rollers between which the film is gripped and which feed the film through said guiding means, said film being looped between said feed rollers and said guiding means, operating means affording the driving of said feed rollers from the projector and a driving shaft on which said drive roller is mounted and around which said film is looped, and means for rotating said driving shaft.

4. In a mechanism for rewinding a motion picture film in heads-out order as the film passes from a projector; a hollow cylindrical reel open on one side and having a rim against the inner side of which the film is wound, means for fixing the heads-out end of the film to said rim after said end of the film has been passed from the projector into the reel through the open side of the latter; means supporting said reel for rotation about a horizontal axis and affording vertical bodily movement of the reel while under rotation, a drive roller mounted to rotate about a fixed horizontal axis within said reel for contacting the film therein and holding the same against the rim whereby on rotation the roller will turn the reel in a direction for winding the film therein, means associated with said roller for guiding the film between the roller and the rim, means for feeding the film from the projector through said guiding means, means for driving said feeding means and said roller, said reel being moved vertically and increasing the space between said rim and said drive roller as the number of convolutions increase during the winding of the film into said reel, said means for supporting said reel affording the removal of the reel therefrom; said reel including a hub and a side wall integral with said hub, means for detachably securing said rim to said side wall, a second side wall, and means for detachably securing said second side wall to said hub for closing the open side of said reel.

5. In a mechanism for rewinding a motion picture film in heads-out order as it passes from a projector, a hollow sectional reel including a hub, a circular side wall fixed to said hub, a cylindrical split rim detachably mounted on the periphery of said side wall, means on the rim for affixing to the inner side of said rim the heads-out end of the film after said end has passed through the projector, a support, a horizontal axle freely vertically movable on said support and on which said hub is detachably mounted so that the reel may be placed on and removed from said axle subject to vertical movement therewith when mounted thereon, feeding means mounted adjacent the projector for feeding film from the projector into said reel after said heads-out end has been attached to the reel and the film has been formed into loops at a point between the feeding means and the reel, means affording the driving of said feeding means from the projector, a rotary shaft operated responsive to said feeding means and extending through the loop portion of the film into said reel, a friction drive roller on said shaft located inside of said reel for contacting the film therein and thereby turning said reel so that the film will be coiled around the drive roller and maintained between said rim and said roller, and a guide flange on said roller for guiding the film into the reel between the roller and said rim.

6. In a mechanism for rewinding a motion picture film in heads-out order as it passes from a projector, a hollow sectional reel including a hub, a circular side wall fixed to said hub, a cylindrical split rim detachably mounted on the periphery of said side wall, means on the rim for affixing to the inner side of said rim the heads-out end of the film after said end has passed through the projector, a support, a horizontal axle freely vertically movable on said support and on which said hub is detachably mounted so that the reel may be placed on and removed from said axle subject to vertical movement therewith when mounted thereon, feeding means mounted adjacent the projector for feeding film from the projector into said reel after said heads-out end has been attached to the reel and the film has been formed into loops at a point between the feeding means and the reel, means affording the driving of said feeding means from the projector, a rotary shaft operated responsive to said feeding means and extending through the loop portion of the film into said reel, a friction drive roller on said shaft located inside of said reel for contacting the film therein and thereby turning said reel so that the film will be coiled around the drive roller and maintained between said rim and said roller, a guide flange on said roller for guiding the film into the reel between the roller and said reel, a second side wall for closing said reel when the latter is removed from said axle, and a hub fixed to the second side wall adapted to telescopically engage the hub on the first named side wall to hold the second side wall in place.

7. In a mechanism for rewinding a motion picture film in heads-out order as it passes from a projector, a hollow sectional reel including a hub, a circular side wall fixed to said hub, a cylindrical split rim detachably mounted on the periphery of said side wall, means on the rim for affixing to the inner side of said rim the heads-out end of the film after said end has passed through the projector, a support, a horizontal axle freely vertically movable on said support and on which said hub is detachably mounted so that the reel may be placed on and removed from said axle subject to vertical movement therewith when mounted thereon, feeding means mounted adjacent the projector for feeding film from the projector into said reel after said heads-out end has been attached to the reel and the film has been formed into loops at a point between the feeding means and the reel, means affording the driving of said feeding means from the projector, a rotary shaft operated responsive to said feeding means and extending through the looped portion of the film into said reel, a friction drive roller on said shaft located inside of said reel for contacting the film therein and thereby turning said reel so that the film will be coiled around the drive roller and maintained between said rim and said roller, a guide flange on said roller for guiding the film into the reel between the roller and said rim, said guide flange contacting the edges of windings of the film in the reel to hold them against displacement.

8. In rewinding mechanism for association with a motion picture projector, a reel support thereon, a hollow cylindrical reel mounted on said support for rotation about a horizontal axis and for bodily movement vertically of the support, a shaft driven by the projector for rotation about a fixed horizontal axis, means inside the hollow reel for affixing therein the heads-out end of a film which has been fed through the projector, a drive roller mounted to said shaft for contacting the film in the reel and rotating the latter so that the film will be coiled around the roller, a guide flange on the roller for leading the film between the inner side of the rim of the reel and said roller, means driven by the projector for feeding the film therefrom to said reel with the film looped around said shaft, including friction rollers for contacting opposite sides of edge portions of the film.

JAMES R. ADAMS.

REFERENCES CITED

The following references are of record in the file of this patent:

UNITED STATES PATENTS

| Number | Name | Date |
|---|---|---|
| 992,098 | Yanch | May 9, 1911 |
| 1,144,697 | Delaney | June 20, 1915 |
| 1,194,982 | Fay | Aug. 15, 1916 |
| 1,950,601 | Droll et al. | Mar. 13, 1934 |
| 2,182,723 | Feller | Dec. 5, 1939 |
| 2,269,653 | Feller | Jan. 13, 1942 |

FOREIGN PATENTS

| Number | Country | Date |
|---|---|---|
| 94,602 | Austria | Oct. 25, 1923 |